US007180875B1

(12) United States Patent
Neumiller et al.

(10) Patent No.: US 7,180,875 B1
(45) Date of Patent: Feb. 20, 2007

(54) SYSTEM AND METHOD FOR PERFORMING MACRO-DIVERSITY SELECTION AND DISTRIBUTION OF ROUTES FOR ROUTING DATA PACKETS IN AD-HOC NETWORKS

(75) Inventors: Phillip D. Neumiller, New Woodstock, NY (US); Guenael T. Strutt, Sanford, FL (US); Dennis W. Davis, Eustis, FL (US)

(73) Assignee: MeshNetworks, Inc., Maitland, FL (US)

( * ) Notice: Subject to any disclaimer, the term of this patent is extended or adjusted under 35 U.S.C. 154(b) by 1031 days.

(21) Appl. No.: 10/022,269

(22) Filed: Dec. 20, 2001

(51) Int. Cl.
*H04Q 7/00* (2006.01)
*H04Q 7/24* (2006.01)
*H04J 3/16* (2006.01)
*H04L 12/413* (2006.01)
*H04L 12/403* (2006.01)

(52) U.S. Cl. .................. 370/329; 370/338; 370/346; 370/447; 370/449

(58) Field of Classification Search ............. 370/312, 370/349, 390, 328–329, 342, 345, 346–348, 370/445–449, 458, 461
See application file for complete search history.

(56) References Cited

U.S. PATENT DOCUMENTS

| 4,494,192 A | 1/1985 | Lew et al. ............. 364/200 |
| 4,617,656 A | 10/1986 | Kobayashi et al. ...... 370/74 |
| 4,736,371 A | 4/1988 | Tejima et al. .......... 370/95 |
| 4,742,357 A | 5/1988 | Rackley ............... 342/457 |
| 4,747,130 A | 5/1988 | Ho ..................... 379/269 |
| 4,910,521 A | 3/1990 | Mellon ................ 342/45 |
| 5,034,961 A | 7/1991 | Adams ................. 375/130 |
| 5,068,916 A | 11/1991 | Harrison et al. ........ 455/39 |
| 5,231,634 A | 7/1993 | Giles et al. ............ 370/95.1 |
| 5,233,604 A | 8/1993 | Ahmadi et al. ......... 370/60 |

(Continued)

FOREIGN PATENT DOCUMENTS

CA 2132180 3/1996

(Continued)

OTHER PUBLICATIONS

Spread spectrum medium access protocol with collision avoidance using controlled time of arrival☐☐Joa-Ng, M.; Communications, 2000. ICC 2000. 2000 IEEE International Conference on vol. 1, Jun. 18-22, 2000 pp. 408-414 vol. 1.*

(Continued)

*Primary Examiner*—Huy D. Vu
*Assistant Examiner*—Nittaya Juntima
(74) *Attorney, Agent, or Firm*—Randi L. Karpinia; Joseph J. Buczynski

(57) ABSTRACT

A communications network which is capable of effectively and efficiently handling fading between mobile wireless user terminals of a packet-switched network with minimal overhead and packet loss, and a method for using the same. The communications network employs an origination mobile terminal and surrounding macroscopic mobile terminals and/or surrounding fixed infrastructure. Communication is established between the origination mobile terminal and surrounding macroscopic mobile terminals and/or surrounding fixed infrastructure. The communication is established via modified request to send (RTS) and clear to send (CTS) messages, wherein the modified messages provide for an additional two sets of k unicast addresses where k equals the maximum number of routes available per route entry in the origination mobile terminal's route table.

10 Claims, 12 Drawing Sheets

U.S. PATENT DOCUMENTS

| | | | |
|---|---|---|---|
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 305/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,721,725 A * | 2/1998 | Want et al. | 370/236 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,828,659 A * | 10/1998 | Teder et al. | 370/328 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,072,790 A | 6/2000 | Neumiller et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,141,559 A | 10/2000 | Neumiller et al. | 455/525 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,226,283 B1 | 5/2001 | Neumiller et al. | 370/340 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,272,117 B1 * | 8/2001 | Choi et al. | 370/330 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,370,123 B1 * | 4/2002 | Woo | 370/278 |
| 6,577,613 B1 * | 6/2003 | Ramanathan | 370/337 |
| 7,031,293 B1 * | 4/2006 | Srikrishna et al. | 370/348 |
| 2001/0053699 A1 | 12/2001 | McCrady et al. | 455/513 |
| 2002/0006123 A1 * | 1/2002 | Angelico et al. | 370/348 |
| 2002/0045435 A1 * | 4/2002 | Fantaske | 455/403 |
| 2002/0080768 A1 * | 6/2002 | Garcia-Luna-Aceves et al. | 370/349 |
| 2002/0167963 A1 * | 11/2002 | Joa-Ng | 370/447 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Phil Karn, entitled "MACA—A New Channel Access Method for Packet Radio".

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for AD-Hoc Networks".

George Vardakas and Wendell Kishaba, "QoS Networking With Adaptive Link Control and Tactical Multi-Channel Software Radios".

* cited by examiner

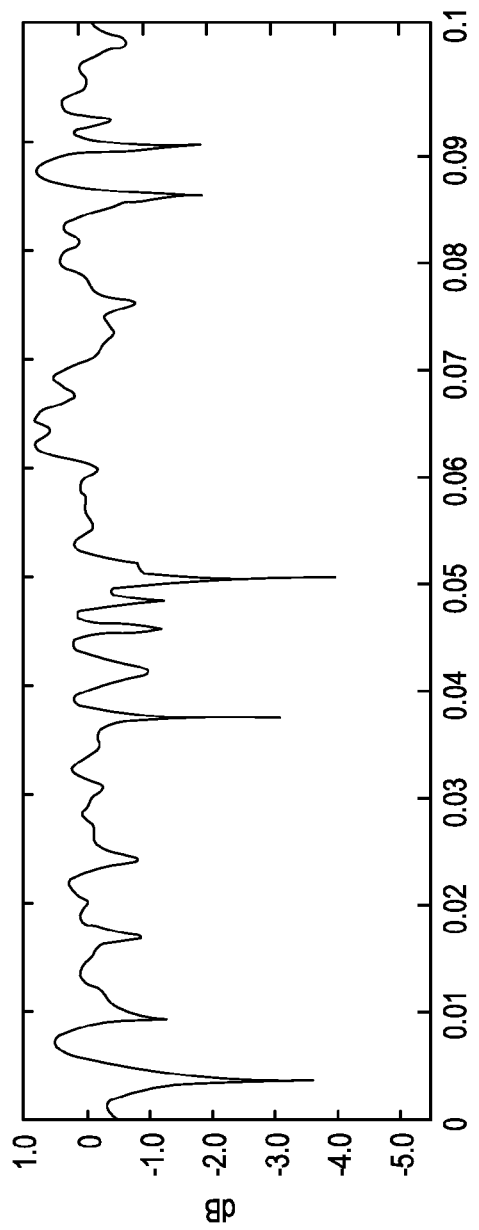
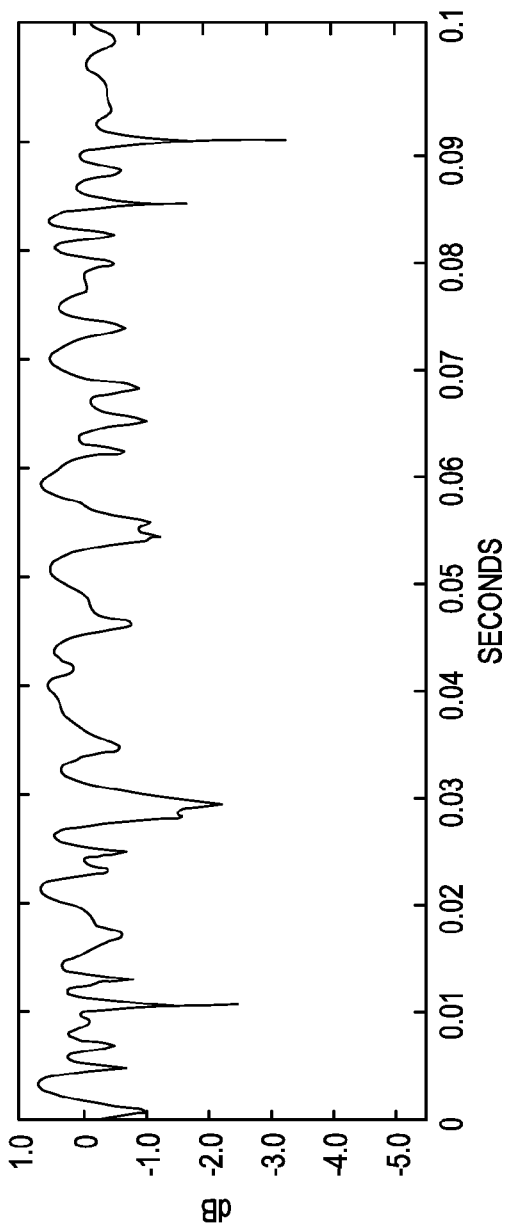

SYSTEM AND METHOD FOR PERFORMING MACRO-DIVERSITY SELECTION AND DISTRIBUTION OF ROUTES FOR ROUTING DATA PACKETS IN AD-HOC NETWORKS

BACKGROUND OF THE INVENTION

1. Field of the Invention

The present invention relates to an improved system and method for enabling a node, such as a remote unit in a wireless network, to perform macroscopic selection and distribution of routes for routing data packets to other nodes in the network. More particularly, the present invention relates to a system and method for enabling nodes in an ad-hoc packet switched communications network to reduce the effects of signal fading by modifying request to send (RTS) and clear to send (CTS) messages to include additional unicast addressing fields comprising two sets of multiple unicast addresses representing the maximum number of data packet routes available per route entry in the node's routing table.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells".

Specifically, a terrestrial cellular network or other type of conventional specialized mobile radio (SMR) system includes a plurality of interconnected stationary base stations that are distributed geographically at designated locations throughout the service area. Each stationary base station includes one or more transceivers that are capable of transmitting and receiving electromagnetic signals, such as radio frequency (RF) communications signals, to and from user terminals, such as wireless telephones, located in its coverage area. The communications signals include, for example, voice data that has been modulated according to a desired modulation technique and transmitted as data packets. As can be appreciated by one skilled in the art, the transceiver and user terminals transmit and receive the data packets in multiplexed format, such as time-division multiple access (TDMA) format, code-division multiple access (CDMA) format, frequency-division multiple access (FDMA) format, orthogonal frequency division access (OFDM) or other suitable modulation formats, which enables a single transceiver at the base station to communicate simultaneously with several user terminals in its coverage area.

Each base station is also connected to one or more gateways that enable communication between the base station and other networks, such as the Internet and the public switched telephone network (PSTN). Accordingly, the base stations in the network enable the user terminals to communicate with each other, as well as with other destinations, such as telephony devices, in the PSTN.

Because each base station is stationary and can only handle a limited amount of communications signal traffic from the user terminals at any given time, the coverage area of a base station can vary depending on the amount of traffic that the base station is expected to experience. For example, the coverage area of a base station can be set to several kilometers in diameter in sparsely populated regions, such as rural regions having light wireless traffic, and can be set to less than a kilometer in diameter in densely populated regions, such as major metropolitan areas having heavy wireless traffic. The wireless communications network therefore must employ many stationary base stations in heavily populated metropolitan areas in order for the network to adequately service the user terminals in those regions.

As can be further appreciated by one skilled in the art, it is also common for a mobile user terminal to travel between different base station coverage areas during use, that is, during a single telephone call. When this occurs, the base station whose coverage area the user terminal is leaving must transfer or "handoff" the user terminal to the base station whose coverage area the user terminal is entering, so that the latter base station can become the base station via which the user terminal and network continue to communicate. In densely populated areas having many base stations with small coverage (often sectorized) areas, this handoff process may need to occur several times during a short period of time as the user terminal travels between the different cells and sectors. However, in regions such as high traffic commuting regions having an inadequate number of base stations or overlays or sectors, more user terminals are competing for access to a base station within their coverage area. Accordingly, the number of lost or dropped calls that may occur during the handoff process can be increased due to the lack of adequate base station accessibility and the break before make hard handoff process itself.

Selection and distribution of data packet routes within wireless communication systems, such as those described above, is known in the art. One such communication system employing selection and distribution is a Code Division Multiple Access (CDMA) communication system as described in Cellular System Remote Unit Base Station Compatibility Standard of the Electronic Industry Association/Telecommunications Industry Association Interim Standard 95A (IS-95A/B), which is incorporated by reference herein.

Many techniques have been developed using the circuit-switched cellular infrastructure to minimize data packet loss during handoff while also minimizing overhead necessary to successfully perform the handoff. For example, as described in IS-95A/B, as a remote unit moves to the edge of a cell, it may commence communication with an adjacent base station, while the current base station continues to handle the call. Both base stations then handle the call simultaneously. During such a scenario, the remote unit is said to be in soft handoff. Soft handoff provides diversity of forward traffic channels and reverse channel paths on the boundaries between base stations. It should also be noted that when the soft handoff occurs between sectors it is referred to as a "softer handoff". Each base station involved in a particular soft handoff demodulates the traffic channel frames and provides the frames to a selector function. The selector function then selects the best frame from each of the active call legs and that frame is forwarded on to the rest of the communication network. This can also employ methods such as maximal ratio combining as is typically done in rake receivers or simple packet error detection methods. Likewise, the communication network provides frames to a distribution function that are to be transmitted to the remote unit. The distribution function distributes these frames to all base stations involved in soft handoff with the remote unit. Thus far this powerful technique has only been widely applied and integrated into CDMA based cellular systems such as those specified and proposed by the Third Generation Third Party Partnership Project (3GPP) Universal Mobile Telecommunications System (UMTS), 3GPP2

(CDMA 2000/IS-95C), IS-95 A/B (2G CDMA) and International Mobile Telecommunications (IMT) 2000.

Macro-diversity selection and distribution is used in cellular systems to allow mobile units to simultaneously communicate with multiple base stations, thus greatly increasing the chances that at least one of the paths will not experience any particular fade or possibly a shadowing. Mobile radios often can experience deep fades of 40 dB or more for milliseconds at a time. FIGS. 1A through 1C depict three independent Rayleigh fading paths of equal envelope power at a frequency of 2.45 GHz. The random occurrence of significant fading events is noteworthy. Fading behavior scales with frequency as a linear compression of the time axis as shown in FIG. 2A. Hence, for mobile radios, the fade rate for a given fade depth will increase linearly with platform speed whereas the mean fade duration will decrease nonlinearly with speed, as depicted in FIGS. 2B and 3, which is described in the publication by Jhong S. Lee and Leonard Miller entitled "CDMA Systems Engineering Handbook", Artech House Publishers, 1998, and is herein incorporated by reference.

U.S. Pat. Nos. 6,226,283, 6,141,559, and 6,072,790 to Neumiller et al., the entire contents of each being incorporated herein by reference, disclose methods for providing macro-diversity selection and distribution in a peer-to-peer distributed manner where the SDU function was moved to the base transceiver stations. However, in hybrid multi-hop ad-hoc network systems that have fixed nodes to backhaul traffic to and from the Internet and the Public Switched Telephone Network (PSTN), a mobile node will use only one of the many routes it may have accumulated via routing protocols to its gateway. A mobile node may also send packets through other mobile nodes if the routing algorithm has no better choices.

Thus, for a fast moving mobile terminal in an ad-hoc network that has an established route, the signal can suffer from fading as those seen on interstate highways when mobile nodes/terminals are surrounded by a large amount of RF scattering clutter surfaces and reflectors. The call could then be dropped.

Accordingly, a need exists for a system and method for providing macro-diversity selection and distribution in ad-hoc communication networks to minimize the affects of fading.

SUMMARY OF THE INVENTION

An object of the present invention is to provide a system and method capable of effectively and efficiently reducing the affect of signal fading on wireless user mobile terminals in a communications network, in particular, a packet-switched network, with minimal overhead and packet loss.

Another object of the present invention is to provide a system and method for achieving the most suitable routing path for the type of data contained in the data packets by enabling a node in an ad-hoc packet switched communications network to reduce transmitter power and maintain a fixed bit error rate (BER) or maintain transmit power and achieve orders-of-magnitude reduction in BER.

These and other objectives are substantially achieved by providing a system and method for enabling a mobile terminal and surrounding macroscopic fixed wireless routers (or other mobile nodes) in a wireless ad-hoc communications network to establish communication with each other to minimize the effect of fading on data packets being transmitted from the originating mobile terminal to the mobile terminals that experience uncorrelated fading. Upon origination, a mobile terminal shall narrowcast a modified request to send (RTS) to the surrounding macroscopic mobile terminals, which each respond to the mobile terminal with a modified clear to send (CTS) message. The modified RTS and CTS messages each provide for an additional two sets of k unicast addresses, where k equals the maximum number of routes available per route entry in the mobile terminal's route table. Data packets can thus be sent by the originating mobile terminal to the surrounding mobile terminals, which can each then further route the data packets to their destination using a similar technique. In the preferred embodiment of the present invention, if the surrounding router receiving a packet from the originating router is mobile (i.e. moving), it is desirable to use the same technique again. If the surrounding router receiving the narrowcast packet is a fixed wireless router, it may choose to forward the packet using unicast or multi-cast routing. It should also be noted that the fast moving mobiles will experience much more fading than fixed infrastructure equipment. Thus, is it not necessary to narrow cast packets on links between fixed infrastructure equipment.

If the packet is destined for the network gateway, that is, leaving the ad-hoc network, the individual routing paths will collapse into one path (possibly a Steiner tree as used in known multi-cast routing art) on route to the destination gateway.

However, if the packet is destined for another mobile host, it may use the additional set of narrow cast addresses to distribute the packets to the mobile terminal.

BRIEF DESCRIPTION OF THE DRAWINGS

These and other objects, advantages and novel features of the invention will be more readily appreciated from the following detailed description when read in conjunction with the accompanying drawings, in which:

FIGS. 1A through 1C depict three independent graphs of Rayleigh fading paths of equal envelope power;

DETAILED DESCRIPTION OF THE PREFERRED EMBODIMENTS

Figure 4:
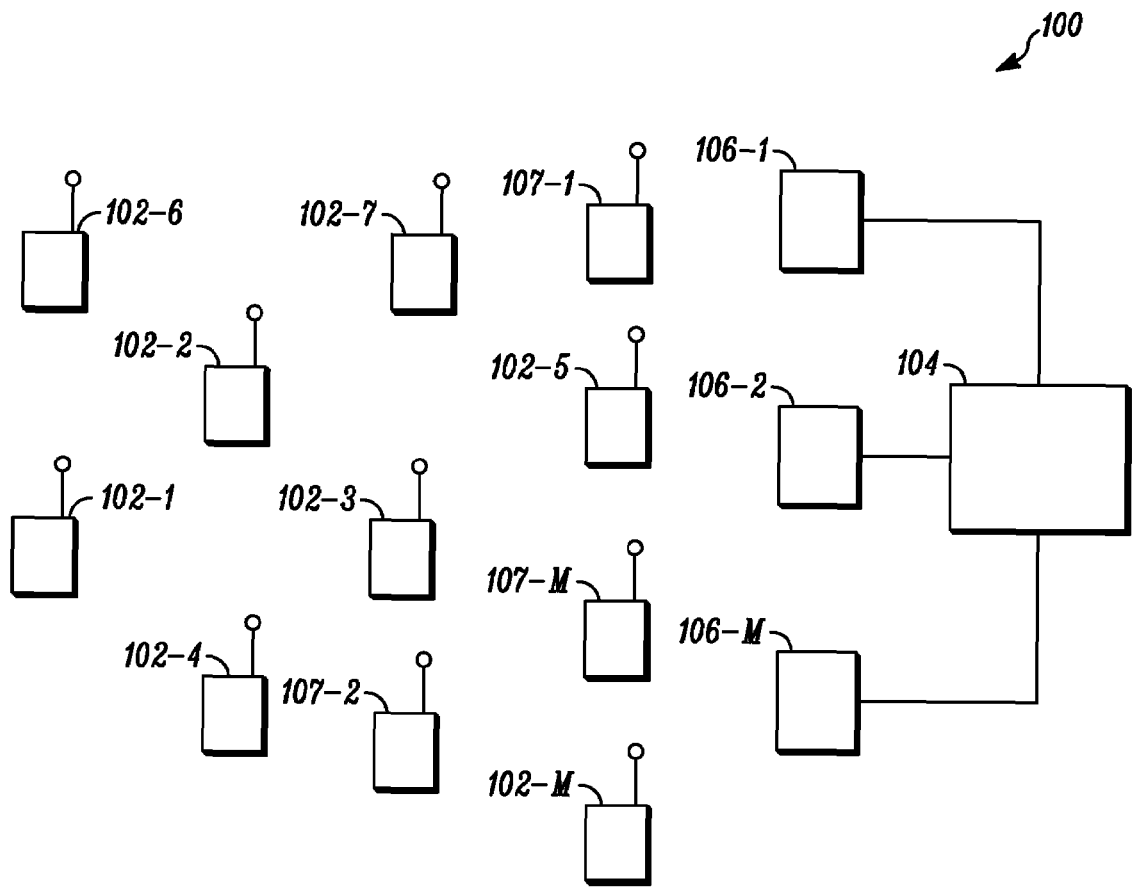
FIG. 4 is a block diagram of an example of an ad-hoc packet switched wireless communications network employing a system and method for enabling a node, such as a mobile user terminal, in the network to apply a route addressing structure including modified request to send (RTSn) and clear to send (CTSn) messages to perform macro-diversity selection and distribution.

FIG. 4 is a block diagram illustrating an example of an ad-hoc packet-switched wireless communications network 100 employing an embodiment of the present invention. Specifically, the network 100 includes a plurality of mobile wireless mobile terminals 102-1 through 102-$n$ (referred to generally as mobile terminals 102), and a fixed network 104 having a plurality of access points 106-1, 106-2, . . . , 106-$n$, for providing the mobile terminals 102 with access to the fixed network 104. The fixed network 104 includes, for example, a core local access network (LAN), and a plurality of servers and gateway routers, to thus provide the mobile terminals 102 with access to other networks, such as the public switched telephone network (PSTN) and the Internet. The fixed network 104 can also include mobile nodes. The network 100 can further include fixed routers 107-1 through 107-$n$ for routing data packets between the mobile terminals 102, the access points 106, and each other. The mobile terminals 102, access points 106, and fixed routers 107 can be referred to collectively as nodes.

Figure 5:
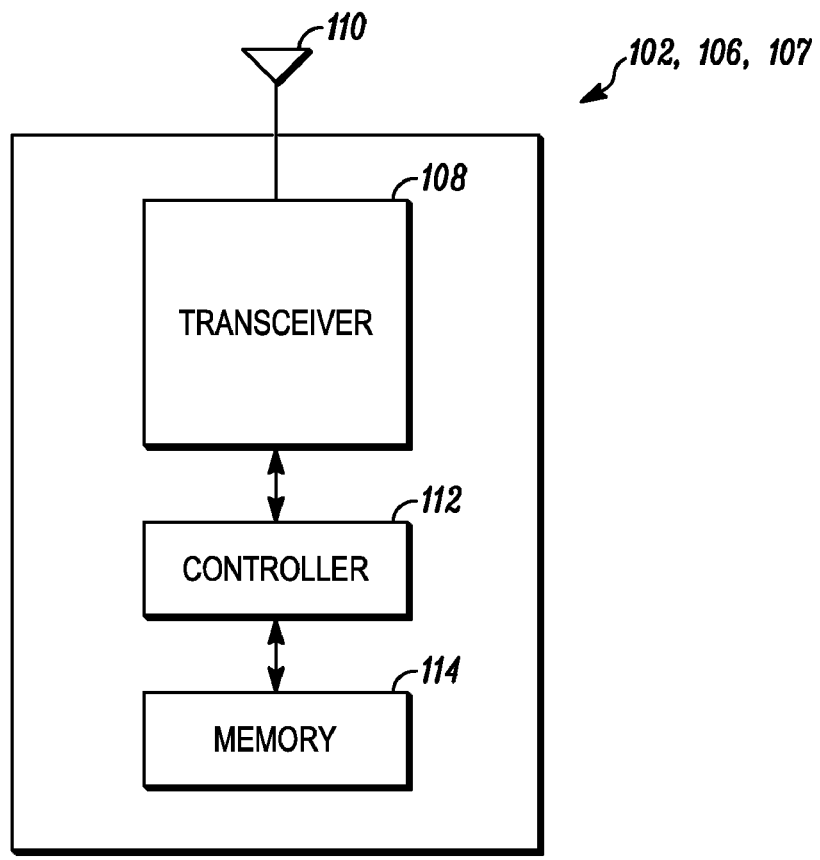
FIG. 5 is a block diagram illustrating an example of a user terminal employed in the network shown in FIG. 4.

As can be appreciated by one skilled in the art, the nodes 102, 106 and 107 are capable of communicating with each other directly, or via one or more other nodes 102, 106 and 107 operating as a router or routers for data packets being sent between nodes 102, 106 and 107, as described in U.S. Pat. No. 5,943,322 to Mayor and in U.S. patent application Ser. Nos. 09/897,790, 09/815,157 and 09/815,164, referenced above. Specifically, as shown in FIG. 5, each node 102, 106 and 107 includes a transceiver 108 which is coupled to an antenna 110 and is capable of receiving and transmitting signals, such as packetized data signals, to and from the node 102, 106 and 107, under the control of a controller 112. The packetized data signals can include, for example, voice, data or multimedia.

Each node 102, 106 and 107 further includes a memory 114, such as a random access memory (RAM), that is capable of storing, among other things, routing information pertaining to itself and other nodes 102, 106 and 107 in the network 100. The nodes 102, 106 and 107 exchange their respective routing information, referred to as routing advertisements or routing table information, with each other via a flooding/broadcast mechanism periodically, for example, when a new mobile terminal 102 enters the network 100, or when existing mobile terminals 102 in the network 100 move. A node 102, 106 and 107 will broadcast its routing table updates, and nearby nodes 102, 106 and 107 will only receive the broadcast routing table updates if within radio frequency (RF) range of the broadcasting node 102, 106 and 107. For example, assuming that mobile terminals 102-1, 102-2 and 102-7 are within the RF broadcast range of mobile terminal 102-6, when mobile terminal 102-6 broadcasts its routing table information, that information is received by mobile terminals 102-1, 102-2 and 102-7. However, if mobile terminal 102-3, 102-4 and 102-5 through 102-$n$ are out of the broadcast range, none of those mobile terminals will receive the broadcast routing table information from mobile terminals 102-6.

Each of the mobile terminals 102-1, 102-2 and 102-7 (or other nodes) that receive the routing table information from mobile terminal 102-6 can store all or a relevant portion of that routing table information in their respective memory 114. Typically, each node 102, 106 and 107 will perform a pruning operation to reduce the amount of routing table information that it stores in its memory 114 as can be appreciated by one skilled in the art.

It is also noted that when a node 102, 106 and 107 broadcasts the routing table information to its neighboring nodes 102, 106 and 107 the node 102, 106 and 107 can include routing table information pertaining to some or all of its neighboring nodes 102, 106 and 107 that it has previously received from them and has stored in its memory 114. Accordingly, a node 102, 106 and 107 receiving the broadcast routing table information from another node 102, 106 and 107 also receives some information pertaining to the routing capabilities of the neighbors of that other node 102, 106 and 107. For example, when mobile terminal 102-2 broadcasts its routing table information, assuming that mobile terminals 102-1 and 102-3 through 102-7 are within the RF range, those node will receive the routing table information from mobile terminal 102-2 and update their routing tables accordingly. This routing table information can include information pertaining to, for example, mobile terminals 102-1, 102-6 and 102-7, which are out of RF range of some nodes, such as mobile terminal 102-3. Hence, mobile terminal 102-3 can receive routing information pertaining to mobile terminals 102-1, 102-6 and 102-7 via the routing table information broadcast by mobile terminal 102-2. In this event, a node can store in its memory 114 routing information pertaining to nodes that are several away. It is noted that a hop is simply a link between two points in a route. That is, a routing path that traverses several nodes will have a "hop" between each node.

An example of the manner in which a mobile terminal 102 can communicate data packets to another mobile terminal 102 in accordance with an embodiment of the present invention will now be described with reference to FIGS. 4–12. Specifically, an RTS (request to send)/CTS (clear to send) handshake exchange is often used in wireless ad-hoc CSMA/CA networks to mitigate against the so-called "hidden node problem", which is described in a publication by Kleinrock Leonard entitled "Packet Switching in Radio Channels: Part I—Carrier Sense Multiple Access Modes and Their Throughput-Delay Characteristics", IEEE Transactions on Communications, Vol. Com-23, No. 12, December, 1975, and in a publication by Phil Karn, entitled "MACA—A New Channel Access Method for Packet Radio", the entire contents of both of these publications being incorporated herein by reference. Furthermore, in network 100, the RTS/CTS message exchange is also used to exchange channel information (for multi-channel CSMA), code information (for code division multiplexing), and power control information among other purposes. According to an embodiment of the present invention, a new and modified RTS (RTSn) and modified CTS (CTSn) message pair that includes additional unicast addressing fields is used.

As discussed in the Background section above, conventional RTS/CTS messages use a single unicast or broadcast addressing scheme. However, the present invention provides for an additional two sets of k unicast addresses, where k equals the maximum number of routes available per route entry in the mobile terminal's 102 route table. This allows a mobile terminal 102 to narrowcast to a set of k first-hop neighbors and to remotely deliver the packet to its destination by up to k last hop neighbors of the destination node.

The present invention can be applied to but is not limited to any popular ad-hoc routing algorithm such as those based on link state routing and/or distance vector approaches. The present invention can be further practiced with routing algorithms that use MAC layer addresses in their routing tables. The present invention can be further practiced when on demand routing is used or when network directed routing is used.

Figure 6A:
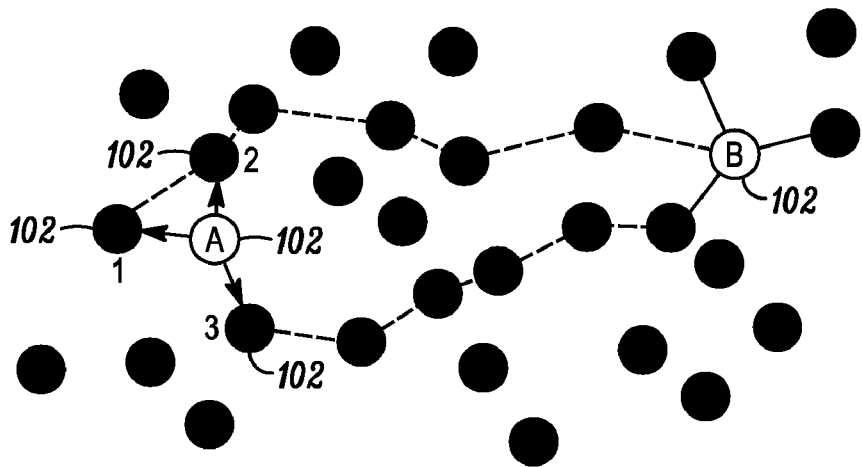
FIG. 6A depicts an example of routing paths from mobile terminal A to mobile terminal B according to an embodiment of the present invention.
Figure 6B:
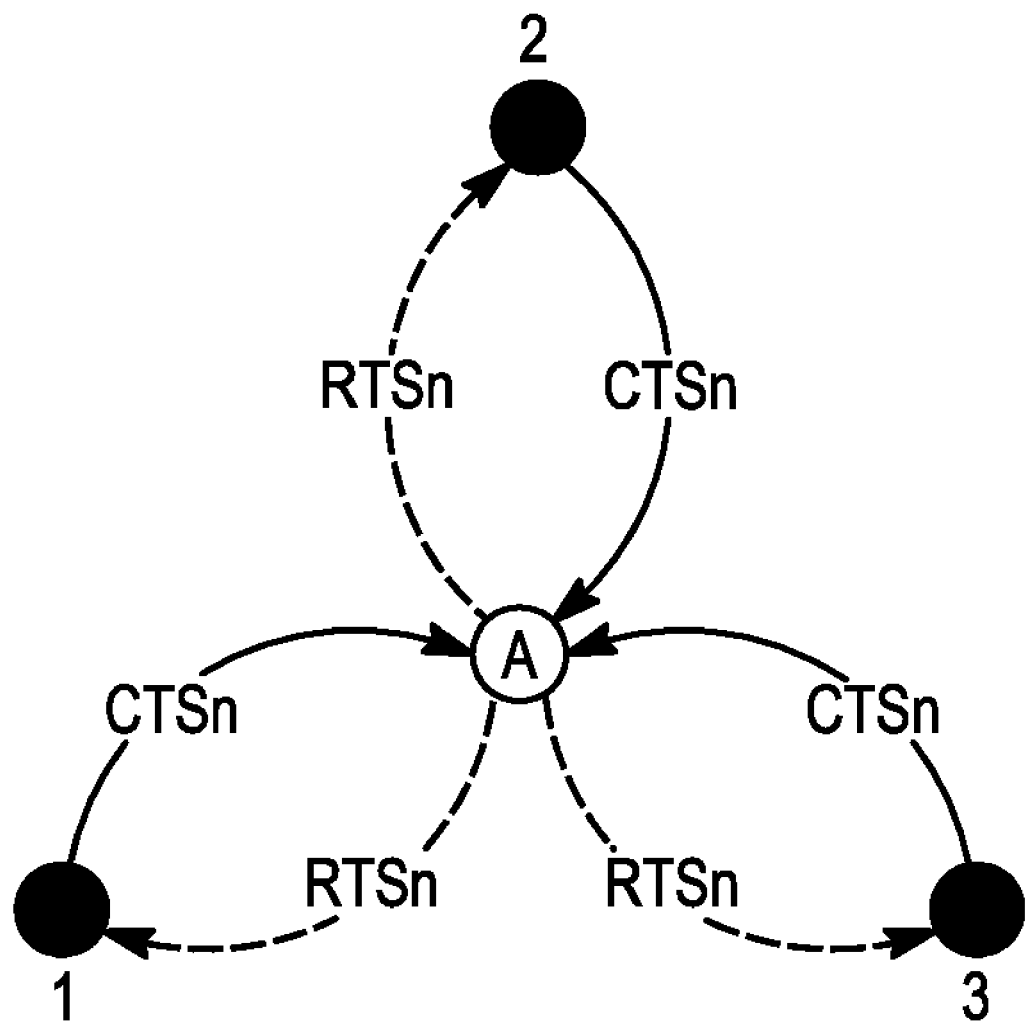
FIG. 6B depicts an example of an exchange of modified RTS and CTS messages between mobile terminal A and the surrounding macroscopic mobile terminals shown in FIG. 6A according to an embodiment of the present invention.

An example of the manner in which a mobile terminal 102 can determine the surrounding macroscopic mobile terminals 102 can be understood with reference to FIGS. 6A and 6B. In FIG. 6A it can be assumed that mobile terminal (MT) A (origination terminal 102) has been determined to be highly mobile by some means (possibly by using location triangulation or other suitable methods). It is also assumed that MT A is in communication with MT B (destination terminal 102). Normally, the routing algorithm for ad-hoc networks will maintain a number of alternative routes to a given destination. In the case where multicast routing occurs, routes may overlap considerably, that is, the intermediate nodes will be the same. In other cases, the routes may remain fairly independent from end-to-end. The present invention uses k to designate the maximum number of simultaneously maintained routes to a given host. If multiple routes use the same first hop, the route is of little use for macro-diversity, so this address is not used in the narrowcast transmission. Since MT A is highly mobile, it is desirable for MT A to request a narrow cast of its packet via all k routes to the surrounding macroscopic mobile terminals 102. Each of the k destinations will respond with a specially formatted CTS message, if the surrounding macroscopic mobile terminals 102 can participate in the narrowcast redirection of the packet. If a destination MT cannot participate, it sends an NCTS message to MT A indicating that it can not participate. This message exchange is illustrated in FIG. 6B. The new or modified narrowcast RTS and CTS messages are marked as RTSn and CTSn respectively.

With reference to FIG. 6B, the idea is to get the first hop out of the mobile onto a more stable link, where the fading due to high mobility, will not degrade its first hop onto the network. This is done through message redundancy by narrowcasting messages to and from highly mobile nodes. Specifically, the surrounding terminals 102 are used to simultaneously transmit messages to the destination terminal 102.

Overall, a mobile terminal 102 in an ad-hoc network 100 will usually maintain a collection of routes to any given host, so that if one route is lost the other routes can be used. The embodiments of present invention take advantage of this knowledge in a pro-active manner. Commonly used channel modulation methods such as QPSK or QAM-16 have bit error rates that are directly related to the signal-to-noise ratio of the channel being used. Typical measurements in CDMA networks show high speed mobiles will often experience $10^{-2}$ BERs. With reference to FIG. 6B, applying macroscopic selection and diversity, for example, three independent $10^{-2}$ links can be combined to form a $10^{-6}$ BER link. Similar gains can be realized in the first and last hop of highly mobile ad-hoc terminals. Stations that hear the RTS/CTS exchange are "supposed" to go dormant during the packet exchange they heard about, provided they are not using another channel as in the case of a multi-channel CSMA/CA system. However, the embodiments of present invention use these stations as macroscopic diversity combiners of the data packets so that fast moving mobile terminals 102 will be guaranteed seamless coverage. This technique is preferably used on mobile terminals 102 that are highly mobile.

It will be noted that embodiments of the present invention introduce no extra routing overhead, since only routes that have already been discovered are used. The assumption is that an on demand or distance vector or link state ad-hoc routing algorithm is populating the routing table, and the technique is simply taking advantage of this. The present invention also does not degrade network performance noticeably since the mobile terminals 102 that heard the RTS/CTS exchange were to remain idle anyway. It should also be noted that data packets may have had to be re-transmitted anyway due to errors caused by fading. Additionally, there is minimal network overhead for the RTSn since it only needs to be sent once physically (i.e. through narrowcast by a packet sender. At the destination, the packets will need to be sent individually, since typically there is no global synchronization in ad hoc networks.

More specifically, prior to sending packets to a mobile terminal A, the mobile terminal B normally has no knowledge of the high mobility of the mobile terminal A and thus no knowledge of the surrounding macroscopic terminals MT 1, MT 2, and MT 3. In accordance with an embodiment of the present invention, for the destination node to know about the macroscopic terminals surrounding the origination node so that they can be used in the reverse direction as macroscopic distribution nodes, end-to-end meta-data is placed in the data payload portion of the data packet to indicate the presence of such macroscopic terminals to the destination mobile terminal. This information is only inserted into the payload as meta-data when the information changes, that is, if one or more macroscopic terminals are no longer initial nodes of the preferred k paths used by terminal A, or when the network topology around terminal A changes.

In the example system of FIG. 6A, when MT A first establishes the condition that it will be using MTs 1, 2 and 3 as macro-diversity repeaters, it forwards this information in meta-data inside the data packet payload to MT B. MT B will then use the new RTSn and CTSn structure when forwarding packets. If MT is B is also a high speed node it will use the same addressing scheme MT A uses upon its own packet originations. This manner the link behavior is symmetrical and progressive towards macro-diversity as needed.

Unlike a conventional RTS/CTS message which only contains unicast source and destination and broadcasting structures, the RTS/CTS messages according to embodiments of the present invention include additional fields. In terms of the RTS messages, the RTS messages are modified in the following manner with reference to FIG. 12. Specifically, a RTSnf message includes a first hop narrow cast address set, an RTSnl message contains a last hop narrow cast address set, and an RTSnfl message contains both the first and last hop narrow cast address set. The messaging type selected by a mobile terminal 102 varies based on the mobility of the communicating terminals 102. For example, highly mobile terminals can require at a minimum RTSnf addressing and can upgrade to RTSnfl upon discovering the last hops route via the meta-data in the data packet payload.

Similarly, the CTS messages are modified in the following manner. That is, a CTSnf message includes a first hop narrow cast address set, a CTSn1 message contains a last hop narrow cast address set, and a CTSnf1 message contains both the first and last hop narrow cast address set.

Figure 8:
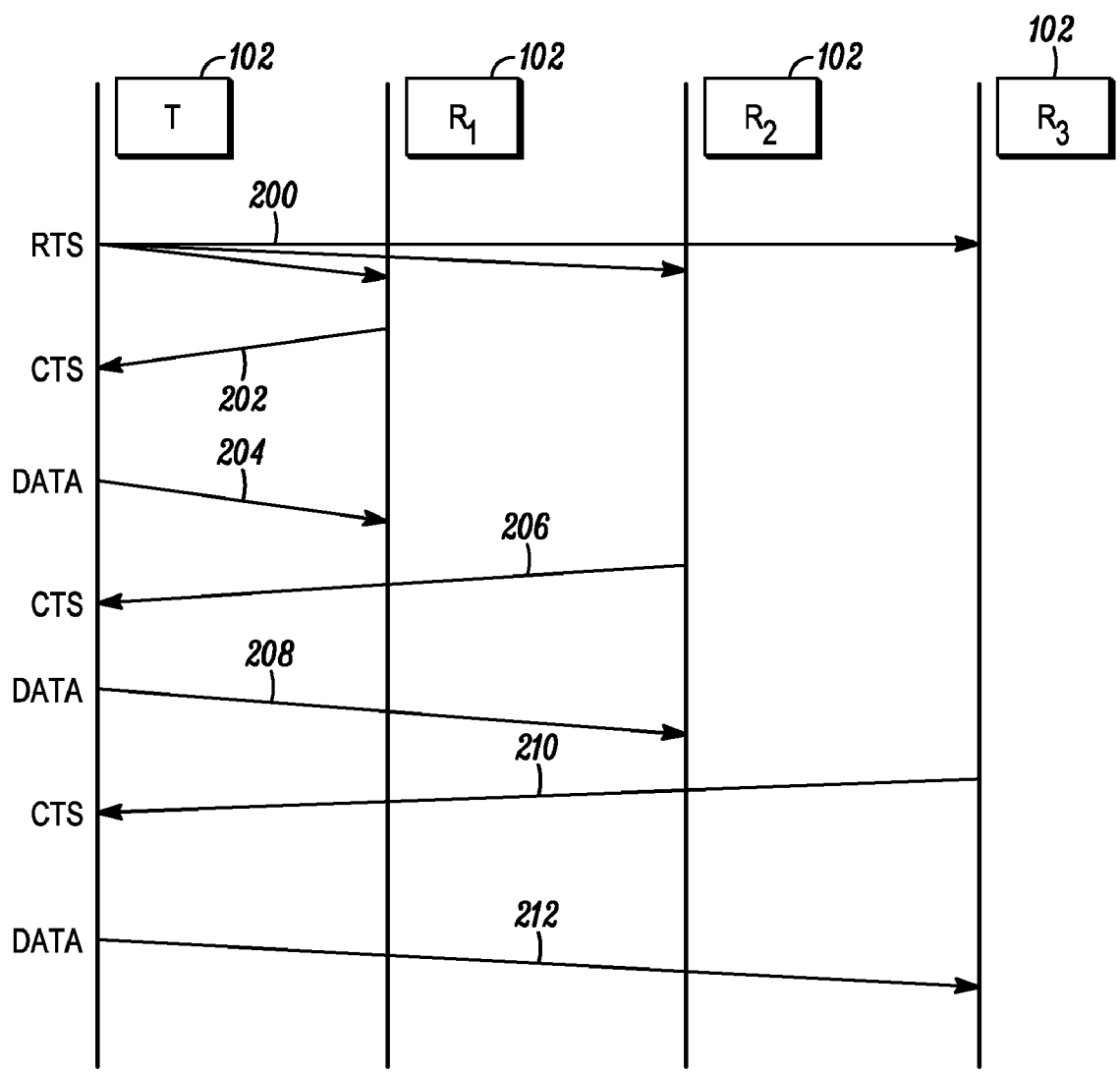
FIG. 8 depicts an exemplary call flow diagram illustrating messaging initiated by terminal A to surrounding macroscopic terminals according to an embodiment of the present invention.

FIG. 8 depicts an exemplary call flow diagram illustrating messaging initiated by an origination terminal to surrounding macroscopic terminals according to an embodiment of the present invention. Specifically, the macro-diversity embodiment uses packet selection, or symbol combining. The origination mobile terminal 102 preferably unicasts the packets to surrounding macroscopic mobile terminals 102. The overhead for this embodiment of the present invention is minimal, i.e. k–1 CTSn messages and has a slightly larger RTS message. The value k is typically quite small, for example, 2 to 5 routes.

The embodiment of the invention will now be further described with reference to the call flow diagram of FIG. 8. At step 200 the origination mobile terminal 102 (A in FIGS. 6A and 6B) communicates a modified RTS message to each of the three surrounding macroscopic mobile terminals 102 (1, 2 and 3 in FIGS. 6A and 6B). At step 202 the first macroscopic mobile terminal 102 communicates a modified CTS message to the origination mobile terminal 102. The origination mobile terminal 102 responds by communicating data to the first macroscopic mobile terminal 102 at step 204. This process is repeated by each of the macroscopic surrounding mobile terminals 102 where each one of the macroscopic mobile terminals 102 first communicates a modified CTS message informing the origination mobile terminal 102 that it is clear to send data. The origination mobile terminal 102 then separately sends the data to each of the macroscopic mobile terminals 102 after receiving the modified CTS message from each macroscopic mobile terminal 102. In other words, after a surrounding macroscopic terminal sends a modified CTS message, the originating terminal 102 sends data. The originating terminal 102 does not wait for all the terminals to send a modified CTS message. Rather, the data is sent to each surrounding macroscopic terminal as it transmits a modified CTS message.

After receiving the data, the macroscopic mobile terminals 102 forward the data in a conventional manner using conventional RTS/CTS message exchanges. Of course, the macroscopic terminals retain the option to also use narrowcast addressing so that macroscopic gain is realized by them as well. This decision can be made based on relative mobility or other metrics.

Figure 9:
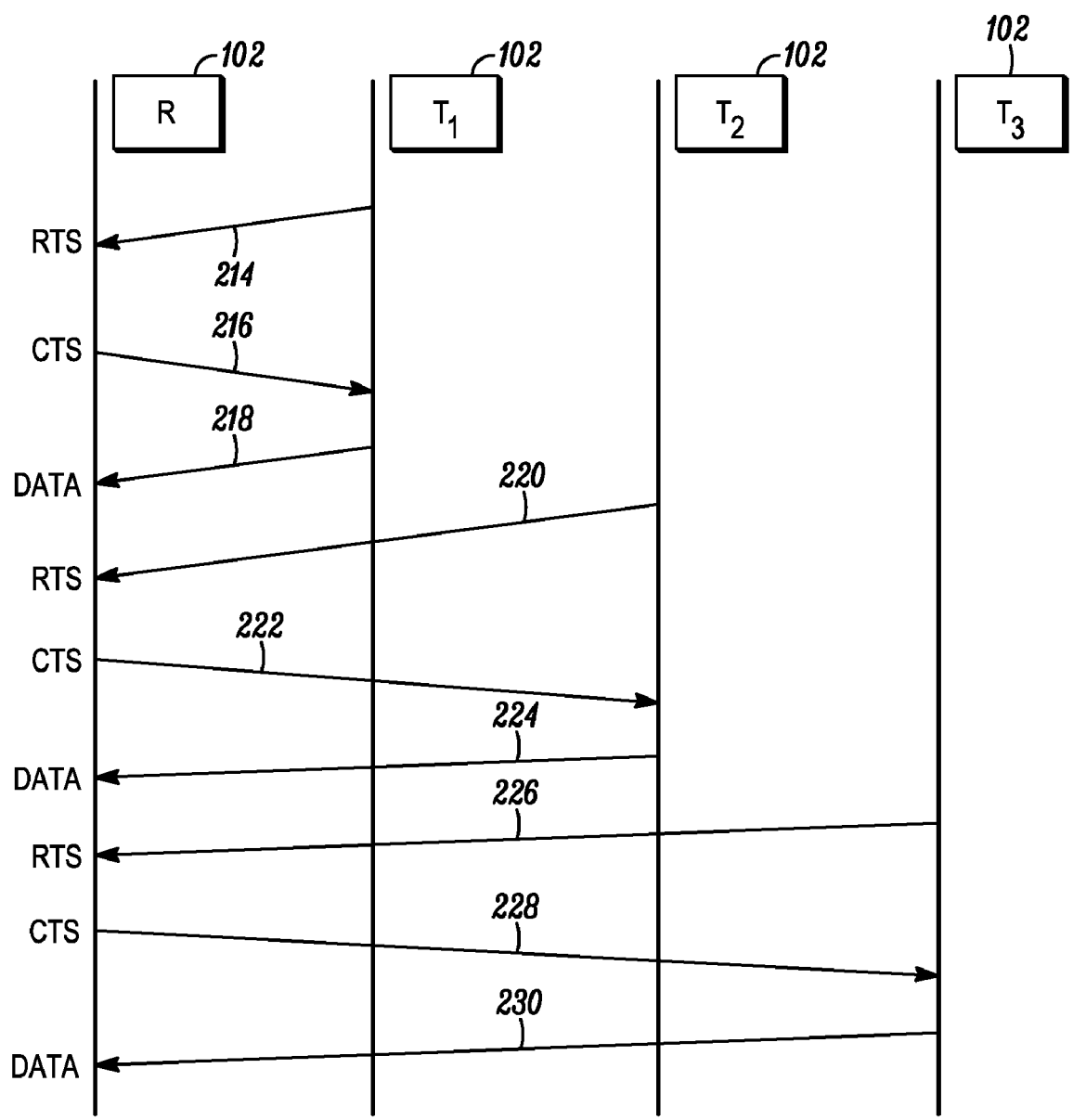
FIG. 9 depicts an exemplary call flow diagram illustrating messaging initiated by the surrounding macroscopic terminals to terminal A according to an embodiment of the present invention.

FIG. 9 depicts an exemplary call flow diagram illustrating messaging initiated by the surrounding macroscopic terminals (1, 2 and 3 in FIGS. 6A and 6B) to origination terminal (A in FIGS. 6A and 6B) according to an embodiment of the present invention. Specifically, embodiment of the present invention is demonstrated in this example by using packet selection, or symbol combining. With reference to the call flow diagram of FIG. 9, at step 214, the first surrounding macroscopic mobile terminal 102 initiates communication with the origination mobile terminal 102 by transmitting a modified RTS message informing the origination mobile terminal 102 that the first macroscopic mobile terminal 102 has data it wants to send to the origination mobile terminal 102. The origination mobile terminal 102 responds at step 216, by sending a modified CTS message informing the first macroscopic mobile terminal 102 that is clear to send data. At step 218, the first macroscopic mobile terminal 102 transmits the data to the origination mobile terminal 102.

The originating terminal and each of the remaining macroscopic mobile terminals 102 repeats these processes as shown in steps 220 through 230.

Data is routed separately, and pre-decoded soft-symbols are buffered into the modem for a fixed amount of time. Combining is then performed to decode the message. Thus, macro-diversity is achieved at the symbol level.

As can be appreciated by one skilled in the art, combining is only necessary when the BER associated with the received packet prevents it from being properly decoded. The destination terminal may therefore perform packet selection to accelerate the routing process.

Figure 10:
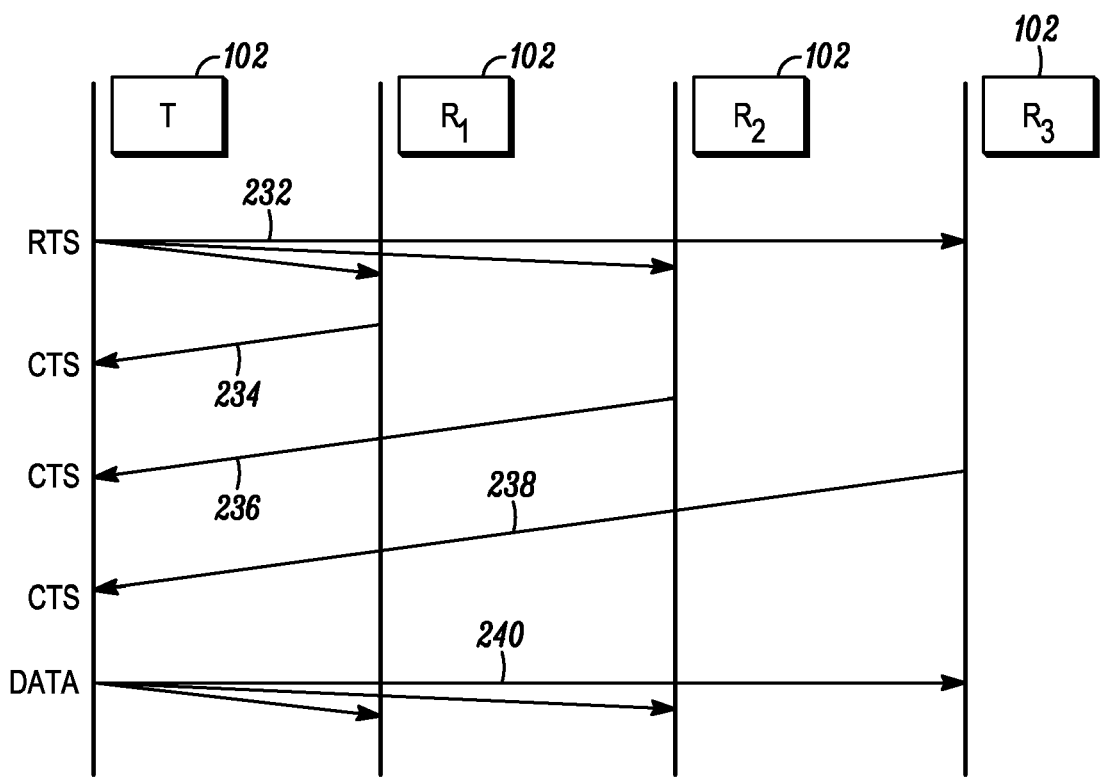
FIG. 10 depicts an exemplary call flow diagram illustrating messaging initiated by terminal A to surrounding macroscopic terminals according to an embodiment of the present invention.

FIG. 10 depicts an exemplary call flow diagram illustrating messaging initiated by an origination terminal (A in FIGS. 6A and 6B) to surrounding macroscopic terminals (1, 2 and 3 in FIGS. 6A and 6B) according to an embodiment of the present invention. Specifically, the embodiment of the present invention is demonstrated using maximum-ratio combining. At step 232, the origination mobile terminal 102 transmits a modified RTS unicast message to each one of the surrounding macroscopic mobile terminals 102. In response to the unicast message, at steps 234, 236 and 238, each one of the communicates a separate modified CTS message to the origination mobile terminal 102. The originating mobile terminal 102 waits to receive CTSn messages from all surrounding macroscopic mobile terminals 102 before sending data. At step 240, the originating mobile terminal transmits one copy of the data message. The data packet only needs to be sent once since each one of the surrounding macroscopic mobile terminals 102 communicated a modified CTS (CTSn) message.

Figure 11:
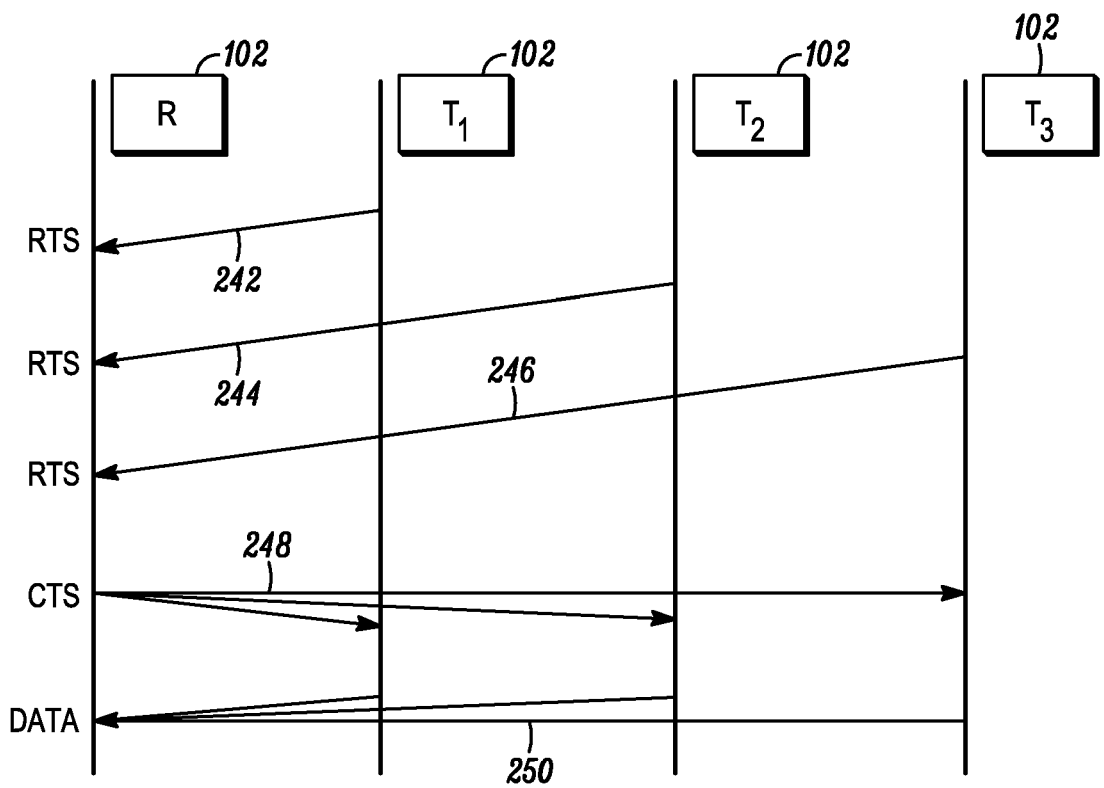
FIG. 11 depicts an exemplary call flow diagram illustrating messaging initiated by the surrounding macroscopic terminals to terminal A according to an embodiment of the present invention.
Figure 12:
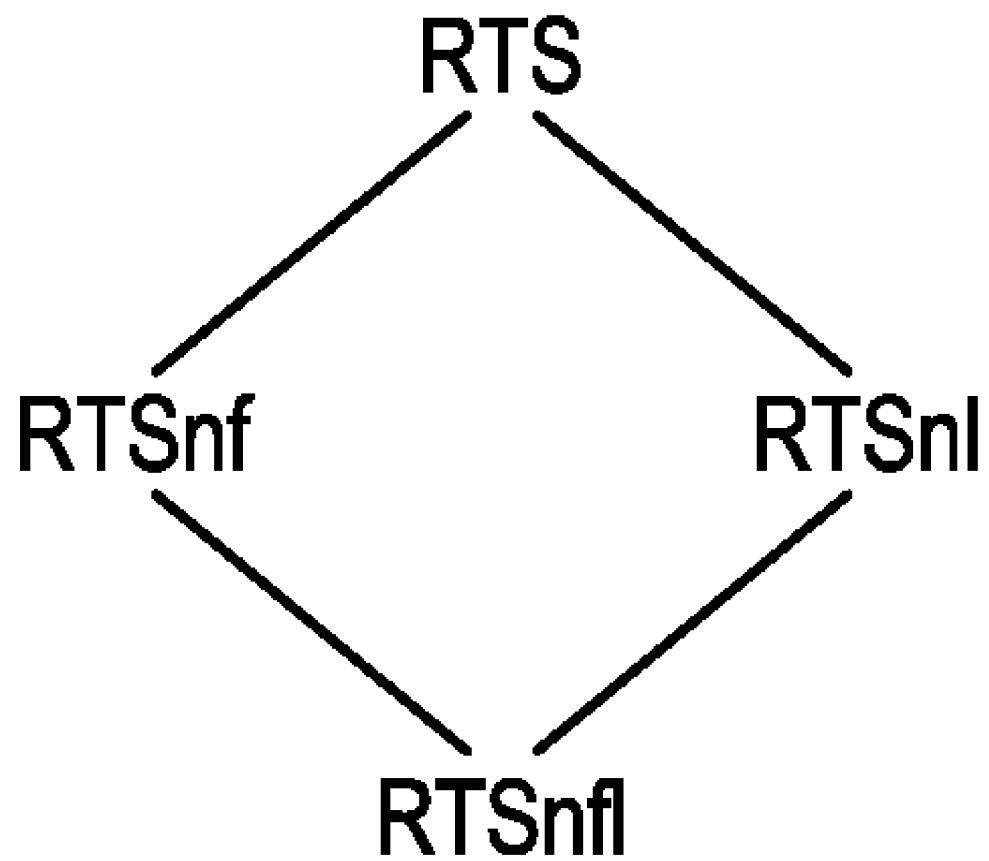
FIG. 12 is an exemplary illustration of a request to send message structure according to an embodiment of the present invention.

FIG. 11 depicts an exemplary call flow diagram illustrating messaging initiated by an the surrounding macroscopic terminals to an origination terminal according to an embodiment of the present invention using maximum-ratio combining. The invention operates in the following manner. At steps 242, 244 and 246, the surrounding macroscopic mobile terminals 102 transmit modified RTS messages to the origination mobile terminal 102. In response to receiving the messages, the origination mobile terminal transmits a unicast modified CTS message to the surrounding macroscopic mobile terminals 102. At step 250, the surrounding macroscopic mobile terminals 102 transmit the same data to the origination mobile terminal 102. Data is transmitted within the RAKE window of the maximum-ratio combiner. Thus, macro-diversity is achieved at the radio frequency (RF) level.

Figure 1C:
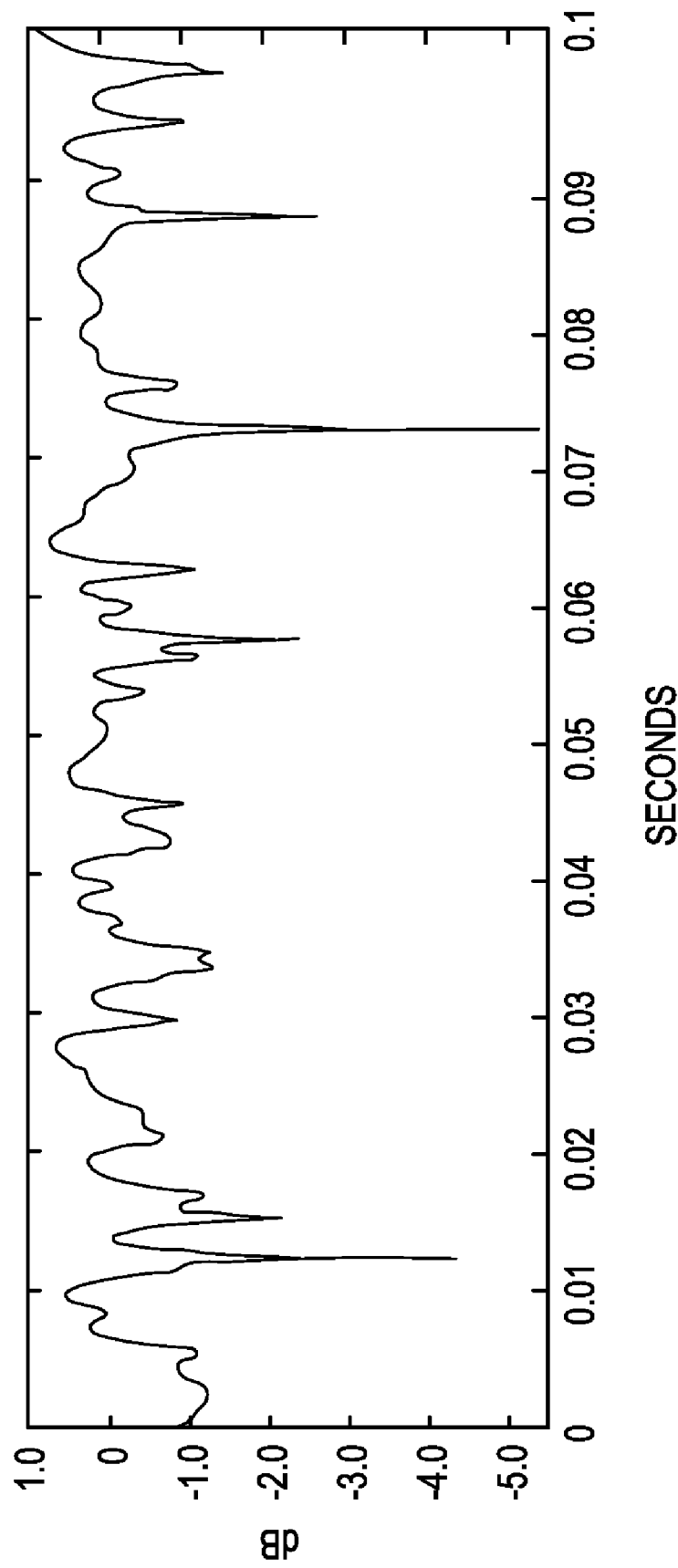
Figure 2A:
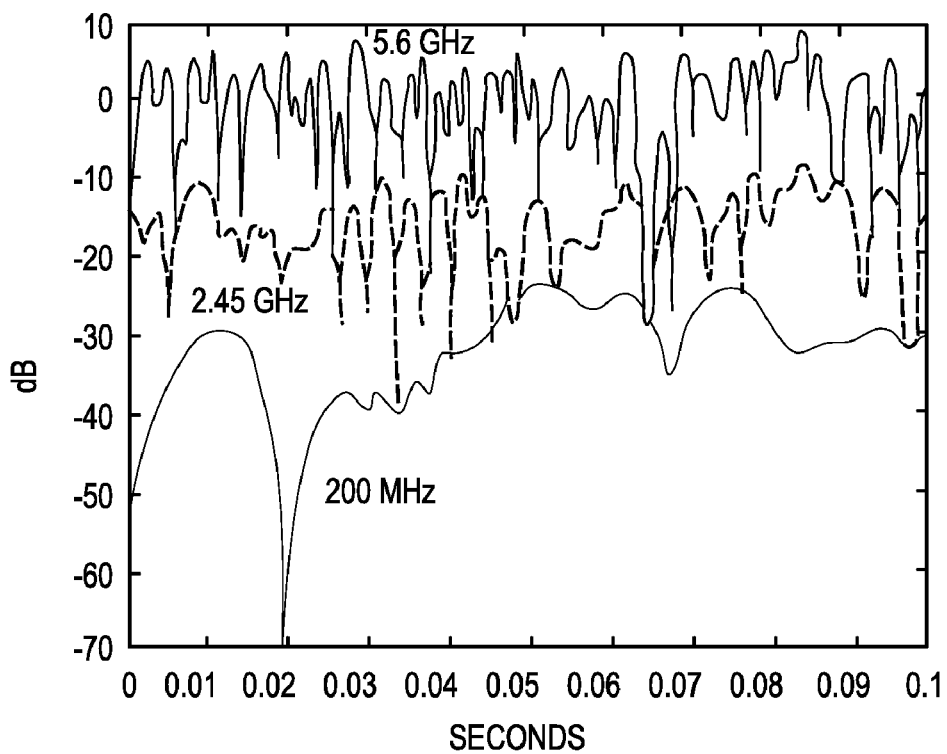
FIG. 2A is a graph illustrating the frequency scaling of Rayleigh fading behavior.
Figure 2B:
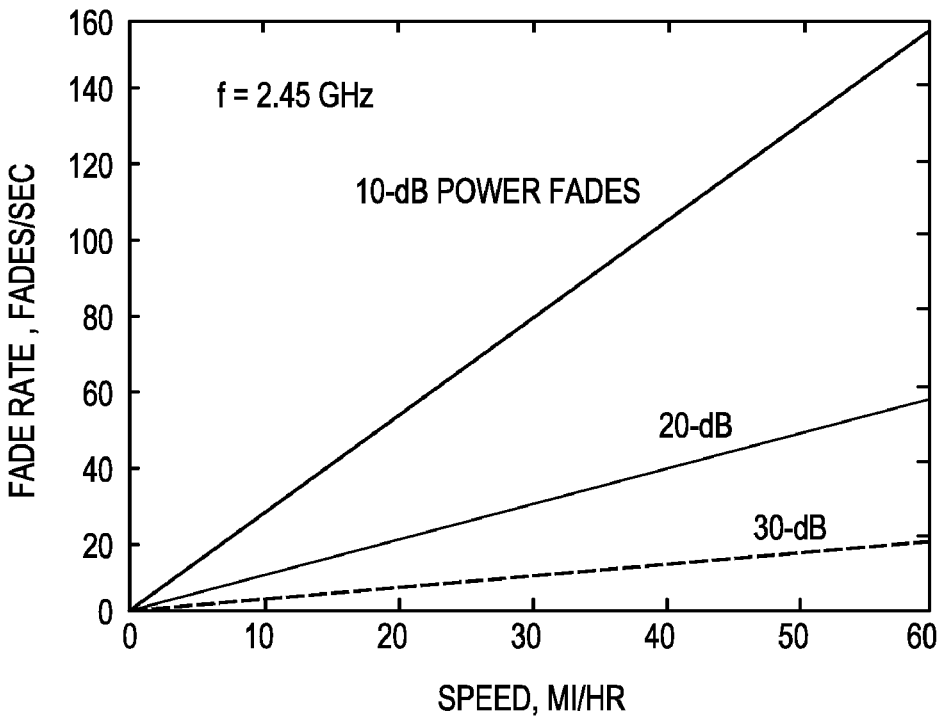
FIG. 2B is a is a graph illustrating the fade rate versus the speed of a mobile terminal.
Figure 3:
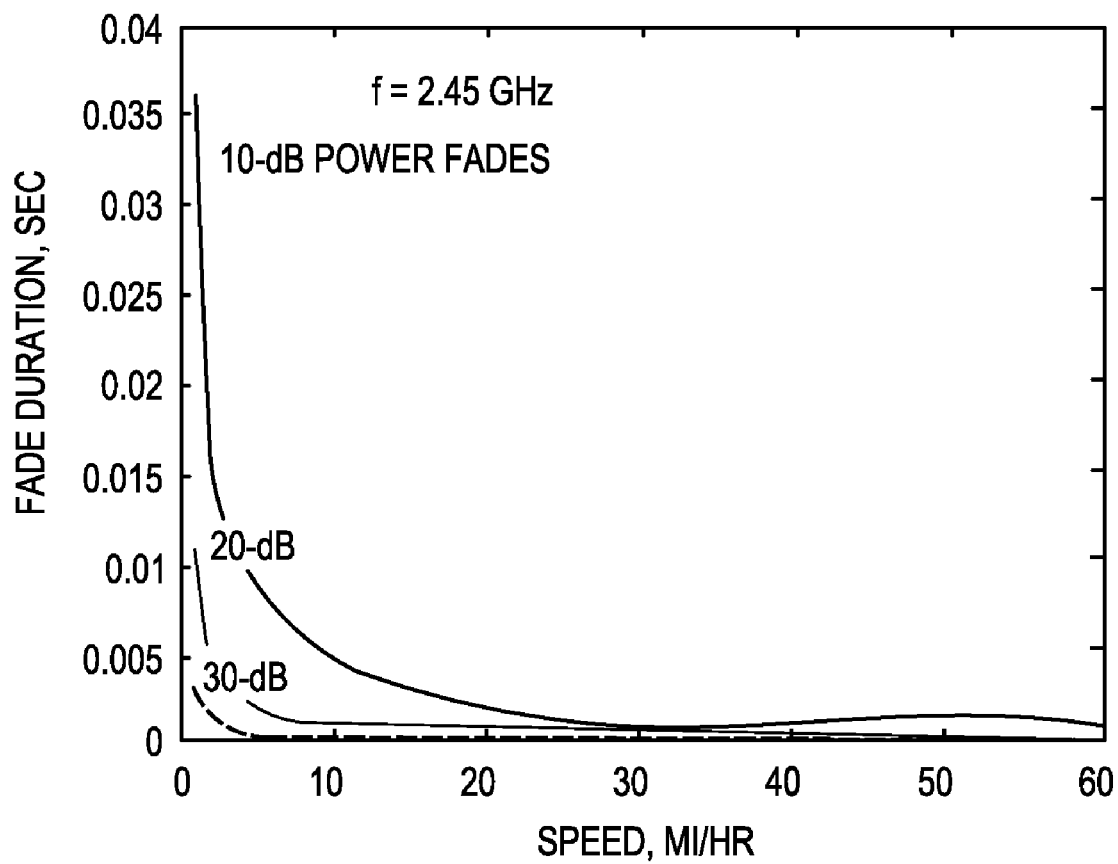
FIG. 3 is a is a graph illustrating the mean fade rate duration versus the speed of a mobile terminal.
Figure 7:
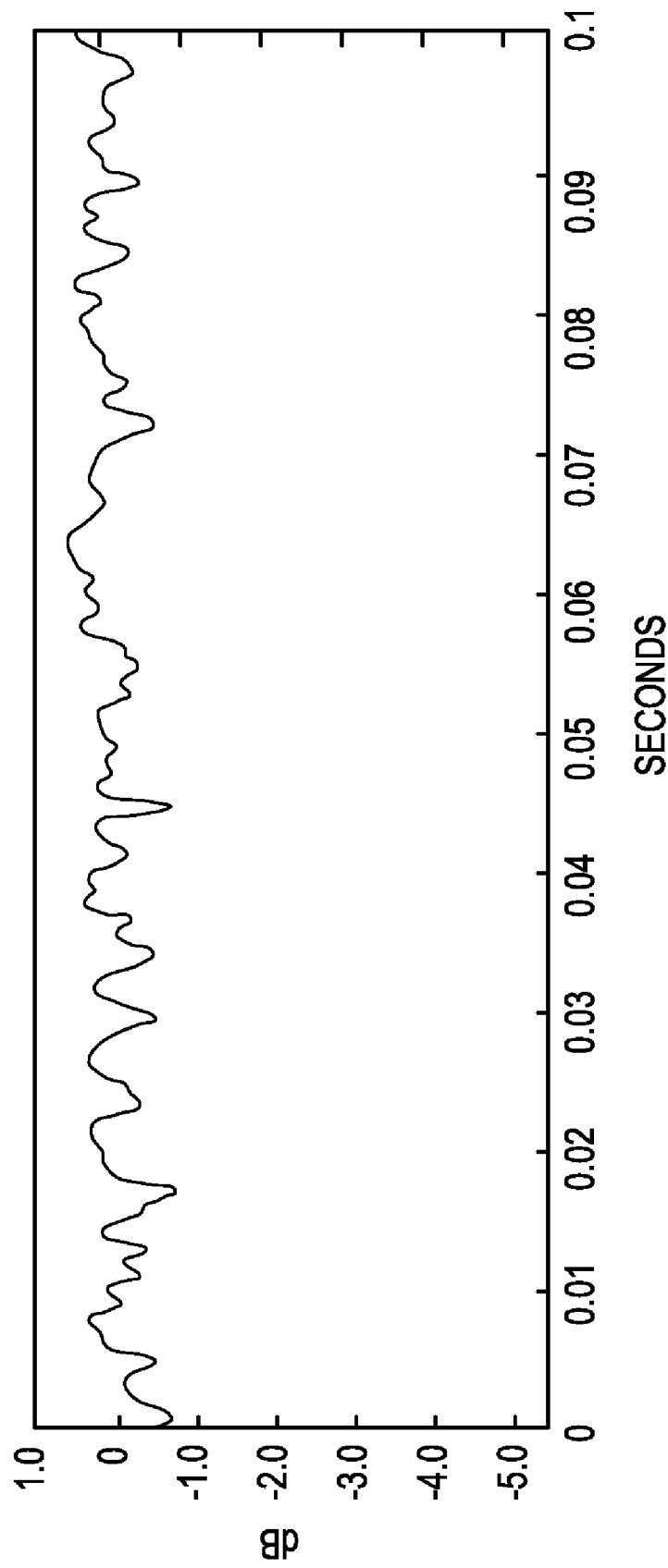
FIG. 7 is a graph of a combined Rayleigh fading path according to an embodiment of the present invention.

It will be noted that the surrounding macroscopic mobile terminals 102 are sending the same data. However, since the origination mobile terminal 102 can be moving, Rayleigh fading can occur. By performing maximum-ratio combining, an improved signal is gained as seen in FIG. 7 where the affects of Rayleigh fading is not as great as the Rayleigh fading as shown in FIGS. 1A–1C in the Background section above.

It will be noted that although the call flows of FIGS. 8–10 were described in the context of the origination mobile terminal, the invention is equally applicable to the destination mobile terminal 102. It will also be appreciated by those skilled in the art that the present invention can be practiced using multi-cast addressing schemes without departing from the scope of the present invention. The presently-disclosed technique also addresses the issue of extended signal dropout in the case of a slow-moving or stationary radio encountering a spatial null in the signal field arriving from a single transmitter. Also, techniques as described in the publication by Phillip D. Neumiller, Peter L. Lei, and Michael L.

Needham, entitled "Open Base Station Transport (OBAST) Architecture, Mobile Computing and Communications Review", ACM-SIGMOBILE, Vol. 4, No. 3, July, 2000, which is herein incorporated by reference, could be applied to cellular ad hoc hybrid architectures.

Additionally, although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for transmitting a data packet from a mobile node in a mobile ad-hoc communications network, said data packet being addressed to a destination node in said network, the method comprising:
   transmitting a request to send message from said mobile node directed to a plurality of relay nodes in said network;
   receiving by said mobile node a respective clear to send message from at least one of said plurality of relay nodes;
   transmitting said data packet from said mobile node to said at least one of said plurality of relay nodes;
   forwarding said data packet from each of said at least one of said plurality of relay nodes to said destination node via a set of available routes in said network;
   receiving at least one realization of said data packet at said destination node via at least one of said available routes; and
   processing said received at least one realization of said destination node to minimize a likelihood of packet error.

2. A method as claimed in claim 1, wherein:
   when said destination node receives a plurality of realizations of said data packet in a Rake window, said destination node combines said plurality of realizations of said data packet; and
   when said destination node receives a plurality of realizations of said data packet outside of said Rake window, said destination node buffers said plurality of realizations of said data packet in a delay jitter buffer and selects one of said plurality of realizations of said data packet meeting a certain criteria.

3. A method as claimed in claim 1, wherein:
   said data packet transmitting multicasts said data packet to said at least one of said plurality of relay nodes.

4. A method as claimed in claim 1, wherein:
   said request to send message and said clear to send messages each include unicast addressing information representing said set of available routes in said network via which to route said data packet to said destination node, each of said available routes including at least one of said plurality of relay nodes.

5. A method for communicating a data packet addressed to a destination node from a plurality of relay nodes in a mobile ad-hoc communications network to said destination node in said network, the method comprising:
   transmitting a request to send message from each of said plurality of relay nodes in said network to said destination node;
   transmitting a clear to send message from said destination node to at least one of said plurality of relay nodes;
   transmitting said data packet from at least two of said plurality of relay nodes in said network to said destination node via a set of available routes in said network;
   receiving at least one realization of said data packet at said destination node via at least one of said available routes; and
   processing said received at least one realization of said destination node to minimize a likelihood of packet error.

6. A mobile node in a mobile ad-hoc communications network, adapted to transmit a data packet being addressed to a destination node in said network, said mobile node comprising:
   a transmitter, for transmitting a request to send message from said mobile node directed to a plurality of relay nodes in said network; and
   a controller, for receiving a respective clear to send message from at least one of said plurality of relay nodes, and further for controlling said transmitter to transmit said data packet to said at least one of said plurality of relay nodes in said network in response to receiving said respective clear to send message,
   wherein said request to send message and said clear to send messages each includes unicast addressing information representing a set of available routes in said network via which to route said data packet to said destination node, each of said available routes including at least one of said plurality of relay nodes.

7. A mobile node as claimed in claim 6, wherein:
   said transmitter multicasts said data packet to said at least one of said plurality of relay nodes.

8. A mobile ad-hoc communications network, comprising:
   a mobile node; and
   a plurality of relay nodes, being within broadcast distance of said mobile node;
   said plurality of relay nodes comprising means for transmitting a request to send message to said mobile node in said network;
   said mobile node comprising means for transmitting a clear to send message to at least one of said plurality of relay nodes acknowledging said mobile node will receive a data packet from said at least one of said plurality of relay nodes,
   wherein said request to send messages and said clear to send message each includes unicast addressing information representing a set of available routes in said network via which to route said data packet to said mobile node, each of said available routes including at least one of said plurality of relay nodes; and
   each of said at least one of said plurality of relay nodes comprising means for transmitting said data packet to said mobile node upon receiving a respective said clear to send message from said mobile node via at least one of said available routes.

9. A mobile ad-hoc communications network as claimed in claim 8, wherein:
   said at least one of said plurality of relay nodes transmits said data packet to said mobile node after every one of said at least one of said plurality of relay nodes has received a respective said clear to send message from said mobile node.

10. A mobile ad-hoc communications network as claimed in claim 8, wherein:
    at least one of said plurality of relay nodes is mobile.

* * * * *